July 1, 1958     D. INGALLS     2,840,897
METHOD OF MAKING FLEXIBLE METAL TUBING
Filed Jan. 7, 1954
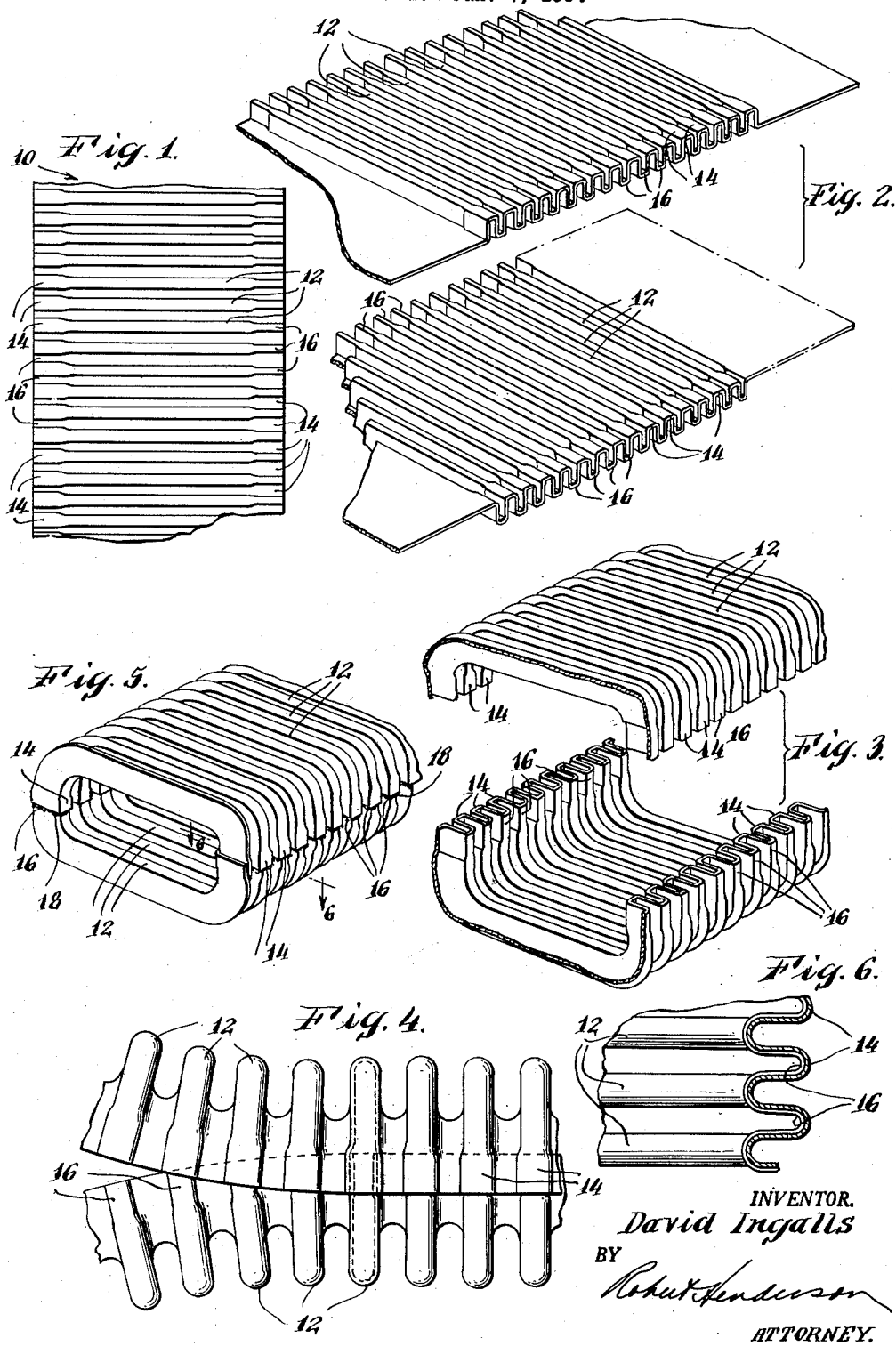
INVENTOR.
David Ingalls
BY
ATTORNEY.

United States Patent Office 2,840,897
Patented July 1, 1958

2,840,897

METHOD OF MAKING FLEXIBLE METAL TUBING

David Ingalls, Westfield, N. J., assignor to Airtron, Inc., Linden, N. J., a corporation of New Jersey Application January 7, 1954, Serial No. 402,693

1 Claim. (Cl. 29—463)

The present invention relates to flexible metal tubing and, more particularly, to tubing which is formed with transverse corrugations that give the tubing its flexibility.

Although tubing according to the present invention may be utilized for sundry purposes, this invention is herein illustrated and described with reference to a form of flexible tubing which is particularly suitable for use as a conducting core of hollow wave guides such as are employed for the purpose of conducting ultra-high frequency electrical energy. It should be understood, however, that the present invention is not limited to that particular type of tubing.

It has been found that, for the purpose of conducting ultra-high frequency electrical energy, a high degree of efficiency in conduction is achieved by employing a hollow metal conducting tube which is approximately oblong or rectangular in cross-section. Such a conducting tube, in various types of electronic apparatus, often must be bent or flexed to enable the apparatus as a whole to be very compactly designed; and, in furtherance of such compactness, it has been found that such apparatus may most easily be assembled if all or some of the various conducting tubes, commonly called wave guides, are inherently flexible so as to facilitate the installation of conductive connections between various components of the apparatus. Such flexible wave guides usually have a protective jacket of soft rubber or other suitable, relatively soft insulating material bonded as by molding or otherwise applied about the conducting tube or core.

The metal conducting core of flexible wave guides has been formed in the past with corrugations, to give flexibility, by winding a longitudinally grooved strip of relatively thin conductive metal upon a rectangular arbor in such manner that adjacent edges of the several turns of the strip metal interlock to form a spiral seam which thereafter is soldered to render the metal tubing air-tight; thus, the electrical transmission or conduction system may be pressurized, if desired, to increase the conductive efficiency thereof. The walls of the corrugations thus formed are capable of bending to some extent, thereby enabling the finished tubing and the finished wave guide to be bent in several directions to facilitate its installation in electronic apparatus.

Although wave-guide cores or tubing formed in the above-stated manner is quite satisfactory insofar as its conducting efficiency is concerned, there is considerable room for improvement because of the fact that rather complex machinery is required to form the strip and to wind and interlock it about an arbor. Furthermore, as the soldered seam has a length of the perimeter of the tubing multiplied by the great number of turns of strip employed in making the tubing, it may be seen that there is a very substantial possibility that leakage may be present at various points along the seam, due to defects in the soldering or to breaks which may occur in the solder at the seam when the tubing is bent. Obviously, if a much shorter soldered seam or seams are provided, there is a much reduced possibility of such defects or breaks. Furthermore, when the flexible tubing is formed by winding and interlocking strip material in the manner just described, it is obvious that the seam, which is long and of several thicknesses of metal, uses an excessive amount of strip material, while if much shorter seams could be provided, there would be a substantial saving in the metal of which the tubing is formed.

Accordingly, an important object of this invention is the provision of an improved method of manufacturing flexible metal tubing having corrugations to impart flexibility thereto.

The foregoing and other objects are accomplished by the present invention of which a single embodiment is disclosed herein, without, however, limiting the invention to the particular disclosed method.

In the accompanying drawing:

Figure 1 is a fragmentary top plan view of a rather long, more or less continuous, transversely corrugated strip of metal which constitutes one of two strips which will form opposite sides of a finished piece of flexible tubing.

Fig. 2 is a perspective view showing in a general way an initial relationship of two corrugated strips such as are shown in Fig. 1.

Fig. 3 is a perspective view showing the manner in which opposite sides of the upper one of the strips of Fig. 2 are bent downwardly while opposite sides of the lower strip of said figure are bent upwardly to shape the two said strips for eventual integration.

Fig 4 is a side elevational view of portions of two strips such as are shown in Fig. 3, but with the two strips being brought together with the ends of some of their corrugations in intertelescaping relationship.

Fig. 5 is a perspective view showing the two mentioned bent strips with ends of their respective corrugations brought together in such intertelescoping relationship to form an assembled piece of tubing.

Fig. 6 in fragmentary sectional view of the assembled tubing substantially on the line 6—6 of Fig. 5.

In marking corrugated, flexible, metal tubing according to the present invention, a flat strip of conductive metal 10 is first given a substantially continuous series of transverse corrugations 12 extending completely from one side to the other of the strip metal. Each of such corrugations preferably is enlarged at one end as at 14, and reduced at its opposite end as at 16. As illustrated, the enlargements 14 on each face of the strip are at the side edge of the strip opposite to the side edge at which the enlargements 14 on the other face of the strip are located. The reductions 16, on the two faces of the strip, similarly, are located at opposite edges of the strip. At each edge, the enlargements at each face are alternate with reference to the reductions at the same face. Such corrugated strip material may be formed in a single pair of corrugating rollers or dies and then cut into separate strips of desired length, or, if desired, similar but separate and oppositely facing corrugated strips may be simultaneously formed between two suitably juxtaposed sets of rollers or dies in such manner that the two corrugated strips would come from the two sets of rollers or dies in the relative positions indicated in Fig. 2.

Thereafter, two such generally flat corrugated strips are bent longitudinally to make them U-shaped in transverse section; and two such bent strips are brought into opposed relationship as shown in Fig. 3 wherein reduced end portions 16 of one strip are in substantially direct opposition to enlarged end portions 14 of the other strip. Then by using suitable guiding means, not shown, the opposed edges of the two bent strips are brought together by bending, or flexing, in the manner shown in Fig. 4. This flexing of the two strips brings enlarged corrugated end portions 14 of the two strips into intimate, at least partial, overlapping or telescoping associaiton with reduced corrugated end portions 16 of the strips. The said enlarged and reduced corrugated end portions, preferably, are so dimensioned that they fit together with a fairly good friction fit, thereby forming a two-piece tubing such as is shown in Fig. 5. In Fig. 6 may be seen the manner in which reduced corrugated end portions 16 of one of the two associated strips fit or telescope into enlarged corrugated end portions 14 of the other strip.

After the two bent strips have been made into a tube such as is shown in Fig. 5 solder 18 may easily be applied to the opposite side junctures of the two strips in order to form air-tight seams along opposite sides of the finished corrugated tubing.

It will readily be understood by those familiar with the pertinent art, that if the two strips are separately corrugated and thereafter held in opposed positions as shown in Fig. 2, they can be continuously maintained in such opposed relative positions while being bent to their forms shown in Fig. 3; and such continuity may be further maintained through the steps of bringing the two strips together and soldering the side seams of the thus formed tube.

It may be observed that tubing produced according to the above-described method and conforming to the tubing shown in Fig. 5 has plural continuous corrugations which are present not only apart from the enlarged and reduced end portions 14 and 16 but continue as well defined corrugations across the junctures formed by the intertelescoping of the mentioned corrugated end portions. Because of these continuous corrugations the finished tubing may be bent or flexed either in a longitudinal plane parallel with the faces of the larger or broader sides of the tubing or in a longitudinal plane perpendicular to said broader sides. Because of the capability of such tubing to be flexed, at least in two directions as just mentioned, a flexible wave guide made from such tubing can likewise be flexed in at least two planes to facilitate its installation in electronic apparatus. Obviously such flexibile tubing may be useful for purposes other than for use in flexible wave guides.

Although the finished tubing illustrated and described herein is oblong in cross-section it should be understood, of course, that similar methods may be employed to form flexible tubing which is circular in cross-section or which may be polygonal in cross-section with any practical number of sides.

In the foregoing description and in the drawings, this invention has been disclosed as involving two similar parts, secured together to form a tube. While the utilization of two parts which are similar is preferable, it should be obvious that the two parts may be somewhat different while still lending themselves to flexing and to being joined to form tubing in the manner explained herein. Hence, the term "pair of strips of metal" or equivalent language has been employed for convenience in the following claims to comprehend two joined parts irrespective of the similarity or dissimilarity of those parts.

As the described principles of the present method may be employed with numerous variations, it should be understood that the present invention is not limited to the precise methods illustrated and described herein but is to be treated as comprehending substantially equivalent methods.

What I claim is:

A method of making flexible, metal tubing comprising forming a pair of metal strips, each substantially to a U-shape in transverse section with a longitudinal series of transverse corrugations which extend completely from one side edge of the strip to the strip's other side edge, changing the width of end portions of said corrugations along each of opposable side edges of said strips by increasing such width along a side edge of one of said strips and decreasing such width along the opposable side edge of the other of said strips to enable all such end portions along both side edges of one of the strips to inter-nest relatively to such end portions along both side edges of the other of the strips, moving said strips longitudinally and convergingly toward each other with the concave sides of the strips facing each other and with inter-nestable end portions of the corrugations of said strips in direct opposition to each other and progressively bending said strips at successive points therealong as such points come together during such longitudinal and converging movement, continuing longitudinal movement of said strips with not-yet-inter-nested portions moving convergingly and inter-nested portions moving in a common plane, and metallicly bonding said inter-nesting portions together.

References Cited in the file of this patent

UNITED STATES PATENTS

| | | |
|---|---|---|
| 445,854 | Lawrence | Feb. 3, 1891 |
| 943,306 | Harry | Dec. 14, 1909 |
| 976,060 | Fulton | Nov. 15, 1910 |
| 1,310,130 | Murray | July 15, 1919 |
| 2,374,498 | Quayle | Apr. 24, 1945 |
| 2,402,497 | Johnson | June 18, 1946 |
| 2,540,141 | Shafer | Feb. 6, 1951 |
| 2,556,187 | Ingalls | June 12, 1951 |
| 2,563,578 | Candee | Aug. 7, 1951 |
| 2,606,953 | Werton | Aug. 12, 1952 |

UNITED STATES PATENT OFFICE
CERTIFICATE OF CORRECTION

July 1, 1958

Patent No. 2,840,897

David Ingalls

It is hereby certified that error appears in the printed specification of the above numbered patent requiring correction and that the said Letters Patent should read as corrected below.

Column 2, line 34, for "intertelescaping" read -- intertelescoping --; line 39, for "in fragmentary" read -- is a fragmentary --; line 41, for "marking" read -- making --.

Signed and sealed this 9th day of September 1958.

(SEAL)
Attest:

KARL H. AXLINE
Attesting Officer

ROBERT C. WATSON
Commissioner of Patents